United States Patent
Kurtz et al.

(10) Patent No.: US 9,656,415 B2
(45) Date of Patent: May 23, 2017

(54) DEVICE FOR PRODUCING MOLDED PARTS FROM PARTICULATE PLASTIC MATERIALS

(71) Applicant: KURTZ GMBH, Kreuzwertheim (DE)

(72) Inventors: Walter Kurtz, Hasloch (DE); Martin Bauer, Tauberbischofsheim (DE); Norbert Reuber, Rothenfels (DE)

(73) Assignee: Kurtz GmbH, Kreuzwertheim (DE)

( * ) Notice: Subject to any disclaimer, the term of this patent is extended or adjusted under 35 U.S.C. 154(b) by 357 days.

(21) Appl. No.: 14/378,524

(22) PCT Filed: Feb. 13, 2013

(86) PCT No.: PCT/DE2013/000077
§ 371 (c)(1),
(2) Date: Aug. 13, 2014

(87) PCT Pub. No.: WO2013/120479
PCT Pub. Date: Aug. 22, 2013

(65) Prior Publication Data
US 2015/0030714 A1    Jan. 29, 2015

(30) Foreign Application Priority Data

Feb. 14, 2012  (DE) .......................... 10 2012 202 233

(51) Int. Cl.
*B29C 44/02* (2006.01)
*B29C 33/04* (2006.01)
(Continued)

(52) U.S. Cl.
CPC .......... *B29C 44/02* (2013.01); *B29C 33/048* (2013.01); *B29C 44/3434* (2013.01); *B29C 44/445* (2013.01); *B29K 2063/00* (2013.01)

(58) Field of Classification Search
CPC ..... B29C 44/02; B29C 44/445; B29C 33/048; B29C 44/3434; B29K 2063/00
(Continued)

(56) References Cited

U.S. PATENT DOCUMENTS 3,236,927 A * 2/1966 Thompson ............ B29C 67/222
264/51
3,259,677 A    7/1966 Zwick
(Continued)

FOREIGN PATENT DOCUMENTS

DE         1154 934       9/1963
DE      690 17 620 T2    12/1990
(Continued)

OTHER PUBLICATIONS

Written Opinion of the International Searching Authority, mailed on Aug. 14, 2016, from counterpart International Application No. PCT/DE2013/000077, filed on Feb. 13, 2013. English and German. Thirteen pages.
(Continued)

*Primary Examiner* — Joseph S Del Sole
*Assistant Examiner* — Thukhanh T Nguyen
(74) *Attorney, Agent, or Firm* — HoustonHogle LLP (57) ABSTRACT

The invention relates to a device (01) having at least two tool parts (03, 53, 63) that are separable at a parting face, wherein the closed tool parts (03, 53, 63) form a mold cavity (02, 52), within which (02, 52) particulate plastic material can be foamed and/or expanded to produce foamed molded parts. According to the invention, in particular to reduce the energy consumption, the tool wall forming the mold cavity (02, 52) is formed at least in sections by a multilayer structure (06, 56, 65) having a thin inner layer that is mechanically supported by a support element.

20 Claims, 5 Drawing Sheets

(51) Int. Cl.
*B29C 44/34* (2006.01)
*B29C 44/44* (2006.01)
*B29K 63/00* (2006.01)

(58) Field of Classification Search
USPC .......................................... 425/4 R, 86, 817
See application file for complete search history.

(56) References Cited

U.S. PATENT DOCUMENTS

| | | | | |
|---|---|---|---|---|
| 3,837,769 | A | * | 9/1974 | Erlenbach ........... B29C 44/3434 425/4 R |
| 3,897,201 | A | | 7/1975 | Belot et al. |
| 4,921,561 | A | * | 5/1990 | Kinugasa ............ B29C 33/3814 264/512 |
| 5,037,592 | A | * | 8/1991 | Erlenbach ........... B29C 44/3419 425/4 R |
| 6,454,553 | B1 | * | 9/2002 | Zobel .................. B29C 44/3419 425/4 R |
| 2004/0247725 | A1 | | 12/2004 | Lang et al. |
| 2006/0278322 | A1 | | 12/2006 | Piatkowski et al. |

FOREIGN PATENT DOCUMENTS

| | | |
|---|---|---|
| DE | 101 56 590 A1 | 5/2003 |
| DE | 103 35 721 A1 | 3/2005 |
| DE | 10 2004 004657 A1 | 8/2005 |
| DE | 10 2004 028462 A1 | 12/2005 |
| DE | 10 2008 018181 A1 | 10/2009 |
| EP | 0 434 024 B1 | 6/1991 |

OTHER PUBLICATIONS

English translation of the International Preliminary Report on Patentability, mailed on Aug. 19, 2014, from counterpart International Application No. PCT/DE2013/000077, filed on Feb. 13, 2013.

International Search Report under date of mailing of Jun. 19, 2013 in connection with PCT/DE2013/000077.

* cited by examiner

DEVICE FOR PRODUCING MOLDED PARTS FROM PARTICULATE PLASTIC MATERIALS

CROSS-REFERENCE TO RELATED APPLICATIONS

This application represents the national stage entry of PCT International Application No. PCT/DE2013/000077 filed Feb. 13, 2013 which claims the benefit of German Patent Application 10 2012 202 233.3 filed Feb. 14, 2012, both of which are hereby incorporated herein by reference for all purposes.

The invention relates to a device for producing foamed molded parts, in particular insulation boards, with the aid of a mold cavity that is enclosed by tool parts according to the preamble of claim 1.

Generic foaming devices serve to produce molded parts of all kinds, in particular if those are foamed from particulate plastic materials. They include both three-dimensional molded parts and plate-shaped molded parts such as insulation boards, in particular for construction, for example in the shape of insulation boards for floors, façades and roofs.

It is known from the state of the art to produce plate-shaped molded parts in individual processes, wherein a plastic material is filled into a mold cavity that is formed by opposing substantially planar mold plates and by a surrounding mold frame, said plastic material being subsequently steam-treated, de-aerated and stabilized. In this way, a plate-shaped molded part corresponding to the geometry of the mold cavity is produced.

To ensure the quality of the plate-shaped molded parts to be produced, it is necessary at first that loosely filled-in plastic material does not immediately start to melt in the mold cavity. In consequence, it is required that the mold plates and the mold frame have a corresponding temperature below a critical softening of the loose plastic filling. The steam treatment performed after the filling now serves to heat the introduced plastic material so that a melting takes place and a continuous mold compound in the shape of a plate is formed. In this connection, energy is introduced, which simultaneously leads to a heating of the mold plates and of the mold frame. To solidify the correspondingly formed body mold, it is now required to perform a subsequent evacuation and cooling, i.e. stabilization. To do so, it is necessary to change the temperature again, i.e. to lower the temperature of the plastic material and also of the mold plates and of the mold frame, so that the produced plate retains its shape after it is removed. This leads to temperature cycles in the mold cavity during the process, the mold plate and the mold frame being subjected to temperature fluctuations in the course of the cycles over the duration of the production of a plate.

To ensure the required stability and a lasting durability of the foaming device, the mold plates in the state of the art are designed such that a substantially solid metal plate, generally made of aluminum, with a thickness of in particular more than 10 mm is provided on the side facing towards the mold cavity, which in some cases is insulated by insulating material on its rear side. To realize the functionally required introduction of steam and the evacuation, the aluminum plate being a mold plate has a plurality of openings, which are usually introduced mechanically, so as to allow for the corresponding passage of steam or for evacuation.

However, the known foaming devices for producing corresponding plate-shaped and other molded parts from particulate plastic materials have the disadvantage that the duration of the production cycle can hardly be reduced because of the necessary reversible temperature changes of the tools and of the component to be produced. The fact that the temperature of the mold plate alternates between the state of a comparatively cool mold plate when filling in the plastic material and when removing the produced molded part and the state of a heated mold plate during the steam treatment results in particular in a thermal stress on the one hand and, on the other hand, in a cooling phase to be necessarily maintained in order to reduce the temperature of the mold plate and of the molded part. Another disadvantage lies in the amount of energy that is required to produce the temperature changes, which is caused in particular by the heat capacity of the mold plates.

Starting from this state of the art, it is therefore the object of the present invention to create a device in which, in contrast to the state of the art, the cycle time can be shortened further and the energy requirement can be lowered further.

This object is attained by a device according to the teaching of claim 1.

Advantageous embodiments of the invention are the subject-matter of the dependent claims.

First of all, the generic device is intended for the production of foamed molded parts. The type of the molded parts is initially immaterial. At least, the molded parts are formed from particulate plastic materials. In this regard, these materials may in particular be EPS or EPP. Their properties and processing are well known to the skilled person and additional explanations thus are unnecessary.

At least, the device comprises two tool parts that can be separated at a parting face. The design of the tool parts is also initially immaterial, while the closed tool parts in this context at least form a mold cavity that corresponds in its shape to the molded part to be produced. In other words, the geometry of the mold cavity substantially corresponds to the shape of the molded part to be produced. In this regard, the mold cavity in the device is a sort of cavity within which the molded part is produced.

Further, the device has a tool wall, which forms the mold cavity and is formed corresponding to the separation of the device along the parting face by at least two tool parts. On its inner side, i.e. towards the mold cavity, the tool wall has a surface with which the particulate plastic comes into contact during the production of a molded part.

In the production of the molded part, a heating medium, in particular hot steam, is generically used, which can be employed in the device to heat the mold cavity. In this context, the particulate plastic material that has been filled into the mold cavity is foamed and/or expanded until it completely fills the mold cavity.

Now, it is provided according to the invention that the tool wall has, at least in sections, a multilayer structure. The multilayer structure comprises a thin inner layer on its inner side facing towards the mold cavity. Furthermore, the multilayer structure comprises at least one support element, the latter being arranged on an outer side of the inner layer and supporting the inner layer mechanically.

By dividing at least one section of the tool wall into an inner layer for surrounding the mold cavity and into a support element for ensuring the required stability of the device during the production process of a molded part, the design of the device is improved towards lower energy consumption.

An embodiment of the device according to the invention is particularly advantageous if it permits the production of foamed insulation boards. Although it is possible with the aid of a device according to the invention to also produce a larger block in order to subsequently divide it into slices or pieces, thus forming a plurality of insulation boards, it is particularly advantageous that in each case a singular insulation board is produced in one production process. These produced insulation boards are used in particular as façade insulation boards in building insulation.

When implementing the tool parts to realize the device and to form the at least one mold cavity, it is particularly advantageous if the mold cavity is defined by two opposing mold plates and by a surrounding mold frame. In this context, one of the mold plates forms a bottom, while the correspondingly opposing mold plate forms a lid. A free spacing is created between the mold plates, which consequently defines the thickness of the mold cavity and the thickness of the molded part to be produced. The free space between the two mold plates, i.e. the mold cavity, is circumferentially enclosed by a mold frame, wherein it is initially immaterial whether the mold plate also encloses the mold plates or one of the mold plates or whether it only bridges the distance between the two mold plates. At least, a corresponding substantially closed mold cavity is formed by the mold plates and by the mold frame.

The connection between the bottom mold plate or the lid mold plate and the mold frame is initially immaterial. However, in the particularly preferred embodiment, at least the lid mold plate can be removed from the mold frame for the removal of the produced insulation board. Like in the state of the art, the way in which the lid mold plate is removed from the mold frame is immaterial as well, while in particular a pivotably connected solution is particularly preferred.

Although, usually, the lid mold plate dives into the mold frame or rests on top of it, it is immaterial for the advantageous embodiment if the mold frame is realized in multiple parts and if a lid-side portion of the mold frame, i.e. a first tool part, is firmly connected to the lid mold plate, i.e. to a second tool part, or if the lid mold plate integrally comprises a portion of the mold frame, i.e. as a one-piece tool part. This consideration will be neglected in the following, but the skilled person can easily add it as an alternative. At least, it is provided that, when the lid mold plate is removed with or without a portion of the mold frame, the insulation board can be removed or ejected at that side. With this in mind, the term "lid mold plate" in the following also comprises a lid-side portion of the mold frame (if designed in this way).

In contrast, the bottom mold plate usually cannot be removed from the mold frame in a manner that would also allow a removal of the molded part from that side. However, it is also initially immaterial in this case whether the bottom mold plate is firmly connected to the mold frame and thus formed in one piece, for example, or whether instead the bottom mold plate can be repositioned relative to the mold frame.

In a particularly advantageous embodiment with corresponding mold plates, at least one of the mold plates is formed as a multilayer structure according to the invention. In this way, on the one hand, the required stability is ensured and, on the other hand, the material volume of the mold plate, which is subject to the temperature change between the cool state when filling in the plastic material at the beginning of the cycle and to the high temperature when finishing the steam treatment, can be significantly reduced as compared to the state of the art.

In an advantageous manner, the inner layer has a plurality of openings on the side facing towards the mold cavity. Through these openings, the heating medium can be introduced into the mold cavity.

The design of the multilayer structure is particularly advantageous if the support elements form a support layer on the outer side or more precisely on the side of the inner layer facing away from the mold cavity. Within the support layer, at least in sections, the heat medium is permitted to flow to the inner layer.

Due to the particularly advantageous embodiment with an inner layer on the side of the mold cavity and a support layer bearing thereon, it is made possible to substantially reduce the tool mass affected by the thermal interaction to the mass of the inner layer, whereas the temperature of the support layer lying behind it and of other tool components lying behind it is of minor importance for the production process.

Further, it is made possible by the advantageous embodiment that for steam treating and/or de-aerating and evacuating, a guiding through the support layer to the openings in the inner layer takes place. Thus, there no longer is any need for a plurality of individual guiding channels to the individually produced openings like there was in the state of the art, but instead it is sufficient to produce a plurality of openings in the inner layer which are connected directly to the support layer.

In this context, it is particularly advantageous if the support layer is many times thicker, in particular more than ten times thicker, than the inner layer. It is substantially the task of the inner layer to form the surface of the insulation board to be produced without improper surface flaws occurring because of a deformation of the inner layer. In this context, however, a predominantly thin inner layer is sufficient if a support layer that is selected correspondingly thicker ensures a corresponding stabilization. In correspondence with the requirement that the inner layer is to be cooled below a threshold temperature at the beginning of the filling-in of the plastic material, it is also particularly advantageous if the inner layer has a heat capacity as low as possible and is thus selected as thin as possible. Moreover, the thicker support layer proves particularly advantageous in terms of the conduction of the corresponding fluid flow within the multilayer structure.

Furthermore, in a particularly advantageous manner, the density of the inner layer is many times, in particular more than ten times, higher than the density of the support layer. Corresponding to the task of the inner layer of forming the surface of the insulation board, a material with higher rigidity and higher durability is to be preferred. The support layer, on the other hand, can be designed in various ways, wherein it in particular has the task of realizing a correspondingly statically stable bridging. In that regard, different versions are being employed. The density of the support layer in particular describes the total weight of the support layer, disregarding the fluid, in relation to the total structural volume of the support layer. Thus, in an advantageous manner, the inner layer has a correspondingly higher density than the support layer.

In this context, it is particularly advantageous if the inner layer has a thickness of between 0.5 mm and 2 mm. Material thicknesses of between 0.8 mm and 1.5 mm have proven particularly advantageous. In this way, a sufficient stability of the inner layer is achieved to ensure the required surface quality, i.e. in particular without any bumps or the like, and to ensure the durability of the mold plate while at the same time a material volume that is significantly reduced as compared to known designs is subject to the alternating thermal stress.

In this context, it is further particularly advantageous if the inner layer comprises a metal sheet and/or a metal lattice and/or a metal screen. Since it is no longer necessary to connect the openings to individual corresponding guiding channels for steam treatment, de-aeration or evacuation, a new freedom arises regarding the arrangement and design of the openings. Further, the introduction of the openings is particularly favored by the lower material thickness in comparison to known designs. Thus, it is possible to laser-introduce a plurality of holes or slots in order to realize corresponding openings in the metal sheet. Alternatively, it is also possible to use a metal lattice, which comes with a plurality of openings. In the extreme case, taking into account the resulting surface structure, it is also conceivable to use a woven metal lattice, which in this case has a low mass being influenced by heat changes, but at the same time enables the fluid to flow through almost freely. In the same way, a sufficient surface for realizing the mold cavity and a sufficient stability are achieved in a particularly advantageous manner by implementing the inner layer as a slot screen, which also allows the fluid to flow through particularly advantageously.

In the implementation, it is further advantageous if the inner layer has a multilayer structure comprising a metal lattice or metal screen on the side facing towards the mold cavity, wherein at least one other layer of the inner layer is a metal sheet or also a metal lattice and/or a metal screen. This means that on the side facing towards the mold cavity, a potentially inherently unstable metal lattice, for example in the manner of a mesh lattice or of a woven metal netting, is present, which allows the fluid to flow through in a particularly favorable manner. To stabilize the topmost metal lattice, another metal lattice, a metal screen and/or a metal sheet is adjoined so as to ensure the required stability and to reduce an indentation of the topmost metal lattice or metal screen in the course of the production process of the molded part to an acceptable degree.

For the implementation of the production process it is particularly advantageous if the support layer permits a largely unhindered fluid flow in all directions across the entire extension of the support layer. This can also be realized in that the support layer is divided into individual zones and an unhindered fluid flow is possible in all directions at least within each of these individual zones. By way of this advantageous support layer, the best possible steam treatment, de-aeration or evacuation of the material filled into the mold cavity is ensured across the entire dimension of the multilayer structure. In this context, it is immaterial if at the edge of the multilayer structure there is an area that is not provided with a support layer. In some cases, a corresponding sealing of the support layer may be required in order to limit the fluid flow at the periphery of the support layer.

For forming the support layer, it is particularly advantageous to provide it with a plurality of support ribs as support elements that are oriented vertically to the inner layer. In this context, the height of the support ribs substantially corresponds to the height of the support layer. This means that in the simplest case the support layer is composed of nothing but a plurality of vertically oriented support ribs. Correspondingly, on one side, the support ribs rest on the inner layer. The manner of the connection to the inner layer is immaterial. The connection can be formed depending on the selected material by welding, gluing or by any other connecting technique. To permit a large structural height of the support layer at low weight and low mass while ensuring the required stability, it is particularly advantageous if the thickness of the support ribs is selected in the range between 0.5 mm and 2 mm.

For ensuring the unhindered fluid flow, in particular across the entire dimension of the multilayer structure, it is particularly advantageous if the support ribs have a plurality of recesses, wherein in a particularly advantageous manner, resting on the inner layer, a plurality of portions alternate, which rest against the inner layer on the one hand, and form a clearing on the other hand. The clearings facilitate a fluid flow and also reduce heat transmission from the inner layer to the support ribs. The type and form of the recesses and of the clearings is immaterial as long as the necessary stability of the support ribs is ensured.

For production as well as for achieving the necessary stability, it is advantageous if the support ribs form a lattice structure. In this context, in a particularly advantageous manner, a rectangular and/or parallel arrangement of the support ribs is selected. Thus, identical parts can in particular be used as support ribs for producing the multilayer structure.

Alternatively to the advantageous implementation of the support layer from a plurality of support ribs as support elements, it is also advantageous if the support layer and thus a support element is made of a foam layer and/or of a sintered layer. In this context, the implementation as a foam layer foamed with open pores, for example as aluminum foam, is particularly advantageous. Thus, the support layer has a low density and consequently a low heat capacity, and the heat conduction is also minimized by the inner layer. Furthermore, the foam layer with open pores proves advantageous with regard to the fluid flow within the support layer.

In a particularly advantageous embodiment, a carrier layer is arranged on the outer side of the support layer, i.e. on the side facing away from the mold cavity. On the one hand, the carrier layer allows an advantageous fluid-tight separation of a freely flow-through support layer from the environment. On the other hand, the carrier layer can advantageously aid the stabilization of the support layer and thus of the inner layer. In this context, the support layer rests with the support element or support elements against the carrier layer. When employing support ribs provided with recesses, they correspondingly bear with one side against the inner layer and with the other side against the carrier layer. In this context, it can be advantageously provided in the bearing against the carrier layer that each bearing alternates with a plurality of portions which present a bearing of the support layer against the carrier layer on the one hand and form a clearing on the other hand.

Again, it is initially immaterial in which way the connection to the support layer and to the carrier layer takes place. So again a connection by screwing or welding can be considered. In this context, it is advantageous to arrange the support layer substantially loosely between the inner layer and the carrier layer, wherein, correspondingly, the latter are connected to each other by connecting means, and thus the hold of the support layer is ensured at the same time.

Moreover, it is particularly advantageous for the implementation of the production process if the carrier layer has at least one steam feed and/or de-aeration and/or ventilation opening or one for each zone of the support layer. Due to the free fluid flow within the support layer in connection with the plurality of openings in the inner layer, a particularly advantageous implementation of the production process is made possible by the connection of the fluid-guiding support layer via the carrier layer to corresponding feeding devices. Thus, a single steam feed may be potentially sufficient to ensure a steam treatment across the entire dimension of the mold cavity. It is immaterial herein if a plurality of connections to a steam treatment system is used for better distribution alternatively to a single steam feed opening.

In this context, it is further advantageous to connect the steam feed opening to a steam treatment system and to provide a connection of the evacuation openings to a vacuum system. In consequence, owing to the steam feed openings and to the evacuation openings, the process can be performed in such a way that the corresponding steam treatment can take place via these openings and then a corresponding evacuation is made possible for stabilization.

The carrier layer lying behind primarily has the task of separating the fluid-fused space of the support layer from the environment. Furthermore, the carrier layer has sufficient stability so that the forces acting on the support layer in the production process can be supported. It is immaterial whether the carrier layer takes on a mean temperature that is steady throughout the entire production process but would be unacceptable in the inner layer. In consequence, it is advantageous to construct the carrier layer as a multilayer and to provide a metal sheet on the side facing towards the support layer and to arrange an insulation on the opposite side facing towards the exterior in order to avoid a cooling of the carrier layer into the environment. Thus, the sealing is realized by means of the metal sheet, the insulation preventing a loss of energy to the environment.

Moreover, it is particularly advantageous if the device further comprises an adjusting device. Said adjusting device comprises at least one adjusting drive by means of which the nominal distance between the two mold plates can be adjusted. In this regard, an adjustability of at least one of the two mold plates relative to the opposing mold plate via the adjusting drive is required. In this context, it is initially immaterial whether the bottom mold plate or the lid mold plate or, alternatively, both mold plates are adjustable by one adjusting device. Generally, however, it is to be assumed that one of the two mold plates is adjustable via the adjusting drive and moves relative to the mold frame. It is at least material that corresponding insulation plates with varying material thicknesses can be formed by adjusting a mold plate and changing the nominal distance.

For realizing the corresponding adjusting drive, different embodiments are available, wherein in particular the design with a spindle motor can be preferably used, in which a threaded spindle of the spindle motor can be extended and retracted. Corresponding to the necessity of only changing the nominal distance for the purpose of a batch change, a slow motion is sufficient, while a precise adjustment of the nominal distance is preferred. This is particularly facilitated by the spindle drive.

Furthermore, it is particularly advantageous if one of the two mold plates is arranged substantially standing relative to the mold frame. The distance is adjusted by moving the corresponding other mold plate, wherein the latter is preferably positioned within the mold frame, i.e. the mold frame surrounds the mold cavity and also the mobile mold plate.

In this context, it is further immaterial how the mobile mold plate is arranged relative to the mold frame. On the one hand, it is possible in this regard to mount the mobile mold plate in the mold frame in such a way that a sliding motion of the mobile mold plate in the mold frame takes place. Also, a roller mounting or ball mounting of the mobile mold plate in the mold frame can be provided. It is at least substantial that the adjusting process performed in the production of the insulation plates does not cause noteworthy damage to the mold plate and to the mold frame due to the relative motion. Alternatively or additionally, it is also possible to provide an acceptable gap between the mold plate and the mold frame, wherein the mold plate is guided by way of other guides in such a manner that no contact has to be feared between the mold plate and the mold frame.

When realizing the support layer, it is particularly advantageous to seal the carrier layer towards the mold frame. In this regard, at least a covering of the inner layer and of the support layer by the mold frame is required. Thus, the sealing of the multilayer structure takes place in the mold frame at the rearmost position so that in relation to the seal, the support layer is positioned on the side facing towards the mold cavity. In this connection, when there is a small gap between the inner layer and the mold frame, no sealing is required at the periphery of the support layer; the latter can rather be designed open towards the exterior, i.e. towards the mold frame. In that regard, a gap between the inner layer and the mold frame simultaneously represents an opening surrounding the mold plate.

When using an adjusting device for changing the nominal distance between the two mold plates, the implementation of a sliding seal between the carrier layer and the mold frame is particularly advantageous if the mobile mold plate is formed by a multilayer structure according to the invention.

Furthermore, it is advantageous for the use of the foamed insulation boards for building insulation if at least one of the two mold plates has an elevated and/or deepened structure on the side facing towards the mold cavity. Thereby, a complementary structure is formed in the produced insulation boards during foaming of the corresponding insulation boards. The design of the structure is initially immaterial; it can be adapted to the required use.

In a particularly advantageous manner, the structure is formed such that a surface with a significantly increased roughness is formed in the produced insulation board. Said formed surface of the insulation board is at least twice as large as the area resulting from the dimensions of the mold plate. In particular in the use for façade insulation, a significantly improved adhesion of glue and plaster to the corresponding insulation board is thus achieved owing to the contact surface being more than twice as large.

Furthermore, a scaled, in particular deepened, line pattern is formed in an advantageous manner on the surface of the insulation board on at least one side. Correspondingly, the associated mold plate needs an elevated line structure. The scaled implementation of the line pattern facilitates the quick and uncomplicated tailoring of an insulation board for connection to corresponding fractions of insulation boards, for example to an end of a building face to be insulated.

In view of the use as a façade insulation board, it is further advantageous if the structure on the surfaces of the two mold plates is selected differently so that account is taken of the different requirements regarding the mounting of the insulation boards on different surfaces.

In a particularly advantageous manner, at least one structure is formed on one side of the insulation board by simply using a metal lattice or a metal screen. This means that the openings in the metal lattice or metal screen or the irregularities of the metal lattice or metal screen are structurally represented on the insulation board, giving rise to a correspondingly enlarged surface of the entire insulation board, so that a correspondingly large adhesion surface is present when the insulation board is used as a façade insulation board.

In the following figures, embodiments of a foaming device according to the invention are outlined by way of example.

Figure 1:
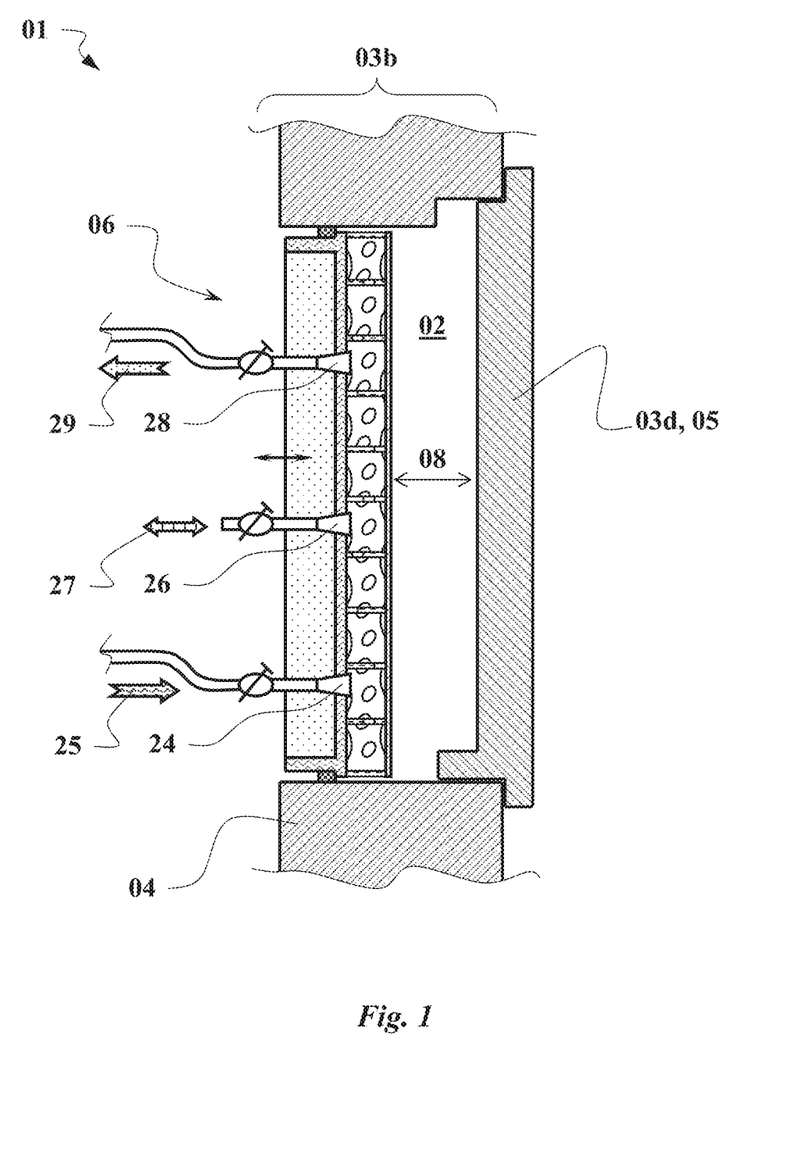
FIG. 1 shows a schematic view of a foaming device 01 according to the invention.

In FIG. 1, an exemplary embodiment of a foaming device 01 according to the invention is schematically outlined. First of all, the structure of the foaming device 01 is visible with a surrounding mold frame 04 and a lid mold plate 05 on one side and a multilayer structure 06 as a bottom mold plate on the opposite side. The mold frame 04 and the multilayer structure 06 form the bottom-side tool part 03b, and the lid mold plate 05 forms the lid-side tool part 03d, which 03d, 03b together enclose a mold cavity 02, which 02 in this case has a corresponding thickness formed by the distance 08 between the mold plates 05d, 06b.

In contrast to the usual embodiment of a foaming device with substantially solid mold plates, the multilayer structure 06 has a multilayer composition, wherein additionally, in an exemplary embodiment, on the rear side of the multilayer structure 06, a steam treatment opening 24 for connection to a steam treatment system 25, a ventilation opening 26 for establishing a free passage to the environment or to the ambient air 27, and further an evacuation opening 28 in connection to a vacuum system 29 are provided.

Figure 2:
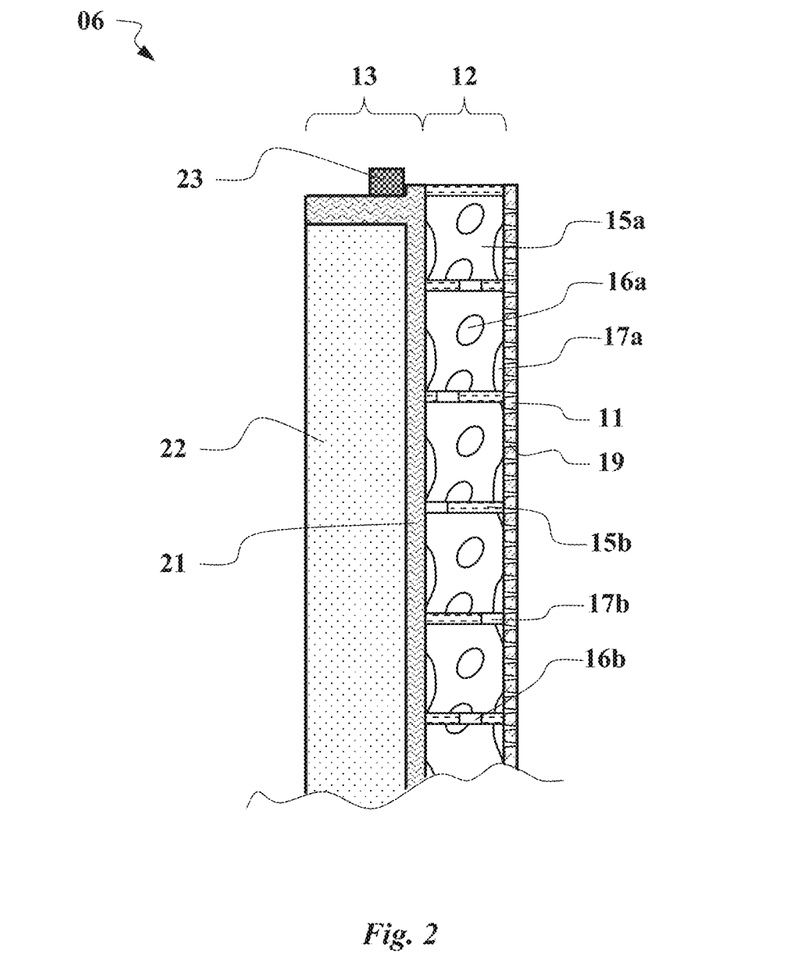
FIG. 2 shows the multilayer structure 06 of the embodiment of FIG. 1 in an enlarged illustration.

The composition of the multilayer structure 06 is again outlined in FIG. 2, wherein the multilayer composition is visible with an inner layer 11 on the side facing towards the mold cavity 02, a carrier layer 13 on the side facing towards the exterior, and an interposed support layer 12. In this context, the inner layer 11 has a plurality of openings 19, through which a corresponding flow of steam and air is ensured. The mold guiding layer 12 herein is composed of a plurality of support ribs 15a and 15b that are arranged vertically to the inner layer 11 and each have a plurality of recesses 16a and 16b. Moreover, the contact to the inner layer 11 and the contact to the carrier layer 13 alternates with respectively interposed clearings 17a and 17b. By means of the recesses 16 and the clearings 17, a free flow of fluid is also ensured within the mold guiding layer 12 and, additionally, a heat transmission from the inner layer 11 to the support ribs 15 is reduced by the clearings 17. Thus, the temperature change of the inner layer 11 between the cool temperature when filling in the loose plastic material and the high temperature during steam treatment is advantageously favored independently of the temperature of the support ribs 15.

To realize the carrier layer 13, in an advantageous manner the latter is also composed of multiple layers, wherein, in the exemplary case, a metal plate 21 is arranged on the side facing towards the support layer 12, which ensures the necessary stability and also separates the free fluid flow within the support layer 12 from the environment. Lying behind it, there is an insulation 22, which reduces heat loss to the ambience. In connection with the advantageously provided adjustability of the multilayer structure 06 within the mold frame 04, the carrier layer 13 further comprises a sliding seal 23, which prevents or at least reduces a loss into/from the ambient air during the steam treatment and during evacuation.

Figure 3:
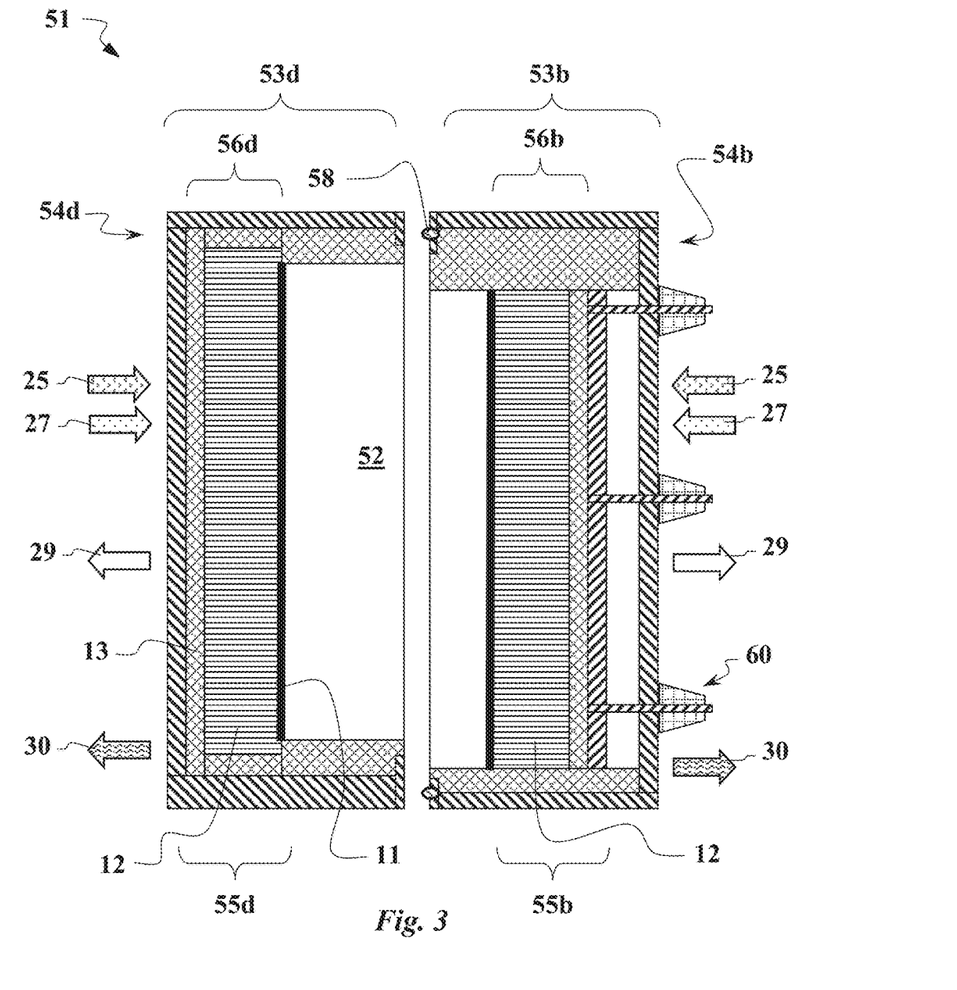
FIG. 3 shows a schematic view of another embodiment of a foaming device 51.

In FIG. 3, another exemplary embodiment of a device 51 for producing foamed molded parts is outlined. The separated structure is visible with a lid-side tool part 53d illustrated on the left hand side and a bottom-side tool part 53b illustrated on the right hand side. The designation as lid-side and bottom-side tool part 53d, 53b is chosen arbitrarily in this regard since, vice-versa, the component illustrated on the left hand side could just as well form a bottom and the tool part illustrated on the right hand side could form a lid. In both cases, the tool parts 53d, 53b each comprise a portion of a mold frame 54d and 54b, respectively. For this purpose, a multilayer structure 56d simultaneously forms the lid mold plate 55d in the lid-side tool part 53d. On the opposite side, the mold plate 55b is arranged in a displaceable manner in the mold frame 54b. In this embodiment, the bottom-side mold plate 55b also has a multilayer structure 56b. The mold frames 54d, 54b and the mold plates 56d, 55b surround the mold cavity 52 of the device 51.

In both cases, the multilayer structure 56d, 56b comprises an inner layer 11 on the side facing towards the mold cavity 52, a support layer 12 behind it and a carrier layer 13 behind that. In this context, a support of the inner layer 11 is realized by way of the support layer 12 and, at the same time, a free flow of fluid is present. The respective connections for introducing steam in connection with a steam system 25, a ventilation opening for connection to the ambient air 27, an evacuation opening for connection to a vacuum system 29 and the necessary connections for connection to a condensate drain 30 are not illustrated, but can be easily added by the skilled person. In this exemplary embodiment, the sealing of the device 51 and thus of the mold cavity 52 is realized by a circumferential tool seal 58 on the mold frame 54b.

Further, the ability for displacement of the bottom-side mold plate 55b by way of a displacing device 60, which can cause a change of the volume of the mold cavity 52 and thus of the thickness of the insulation boards to be produced is indicated.

Likewise, a shoulder between the mold frame 54b of the bottom-side tool part 53b and the mold frame 54d of the lid-side tool part 53d is visible, said shoulder leading to a complementary stepped shoulder on both sides of the produced insulation boards.

Figure 4:
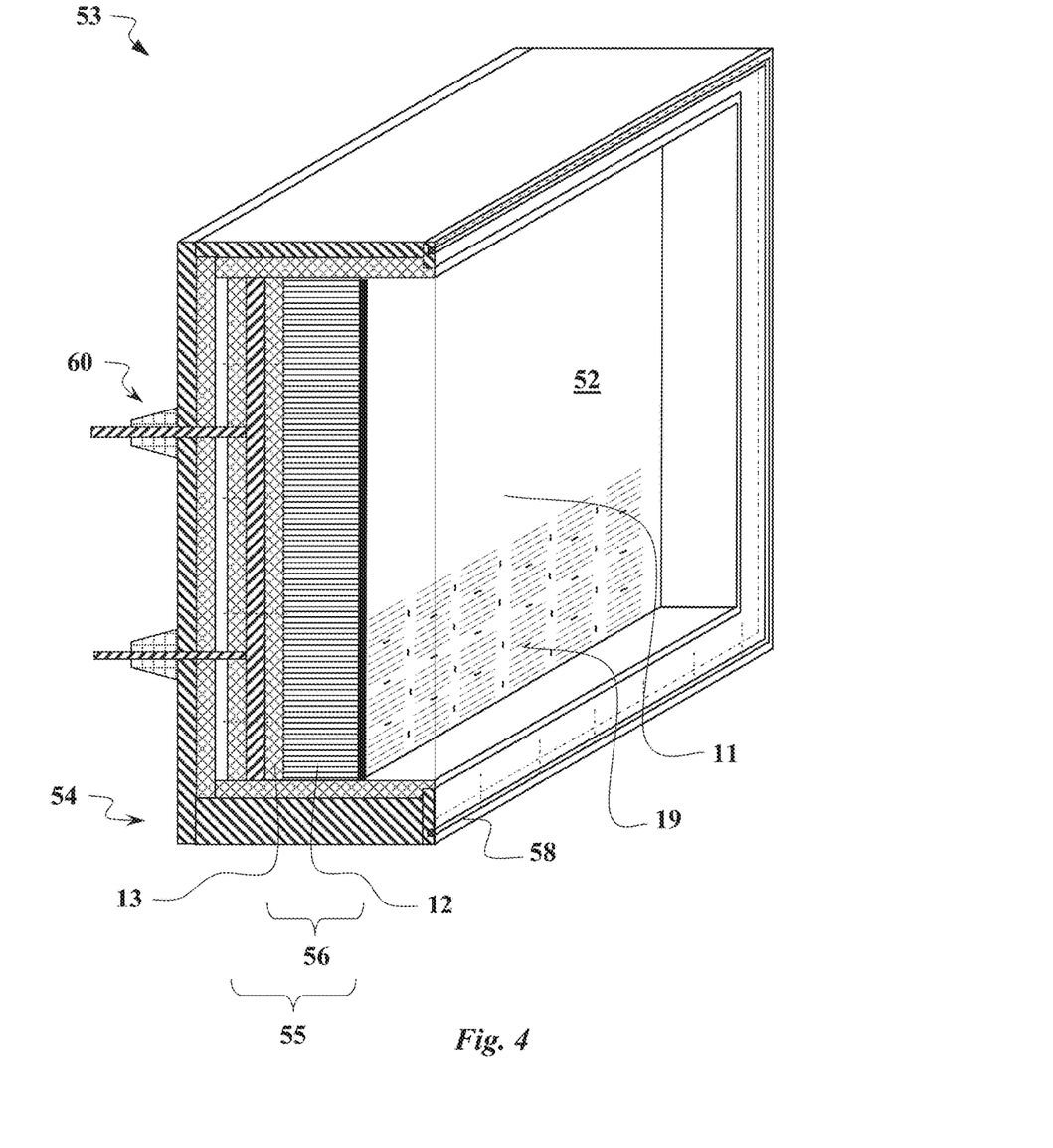
FIG. 4 shows an exemplary embodiment complementary to FIG. 3 for a tool part 53 with a mobile mold plate 55.

In FIG. 4, a possible exemplary embodiment of a tool part 53 is outlined. Again, the exemplary composition of the tool part 53 is visible with a circumferential mold frame 54, in which a mold plate 55 is located in a displaceable manner. In this case, the latter has a multilayer structure 56 with an interior inner layer 11, a support layer 12 lying behind it and a carrier layer 13 lying behind that. Again, a displacement device 60 is present, by means of which the mold plate 55 can be displaced within the mold frame 54.

Figure 5:
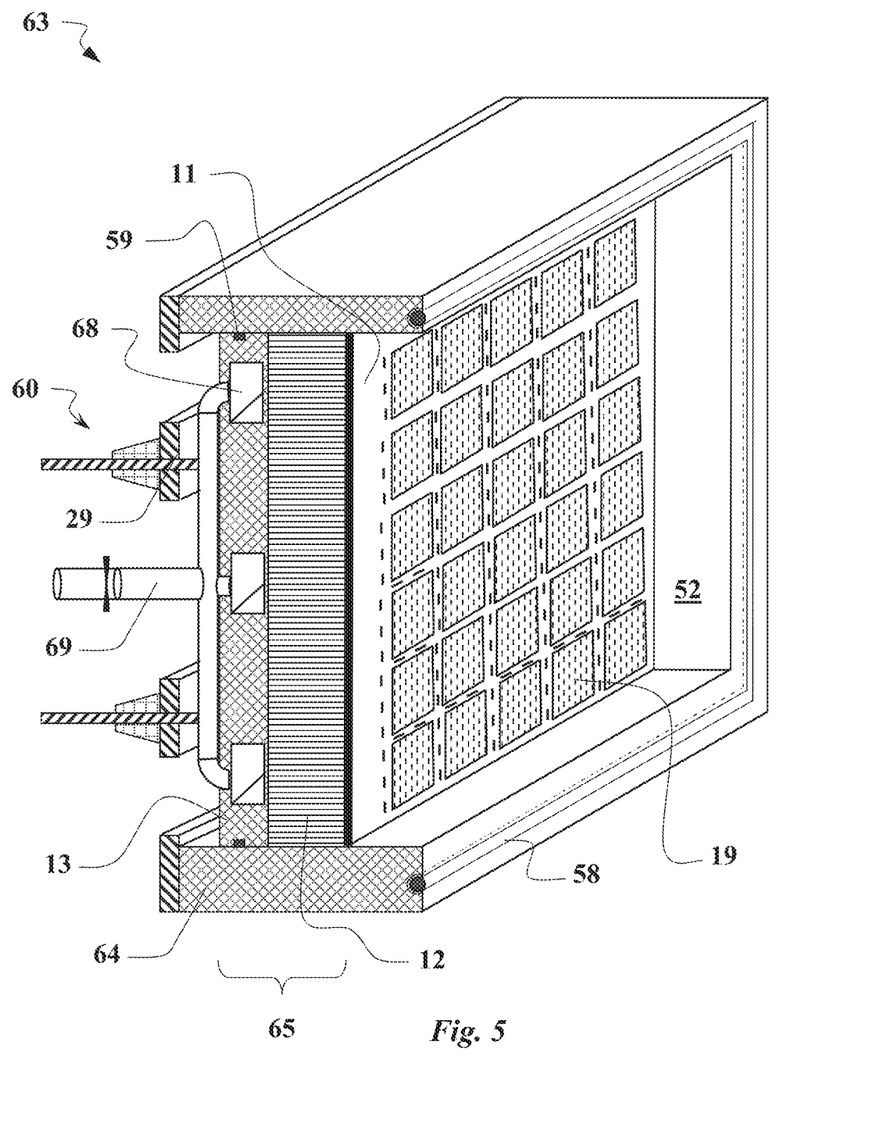
FIG. 5 shows an alternative embodiment complementary to FIG. 4 for a tool part 63 with a mobile mold plate 65.

In FIG. 5, an alternative exemplary embodiment of a tool part 63 is outlined. In contrast to the previously outlined embodiment of FIG. 4, this one comprises a seal between the mobile mold plate 65 and the mold frame 64. This seal 59 is located in the carrier layer 13, which in this respect belongs to the multilayer structure 65 as a mold plate. Again, a support layer 12 is present as a fluid guiding layer and an inner layer 11 with a plurality of openings 19 is present on the side facing towards the mold cavity 52. Alternatively to the designs outlined before, in this exemplary embodiment, the multilayer structure 65 comprises a plurality of fluid openings 68, all of which are connected to a fluid feed/drain 69. Through it, a connection to a steam system and also to a vacuum system is established.

The invention claimed is:

1. A device for producing foamed molded parts from particulate plastic materials, said device comprising:
   at least two tool parts separable at a parting face, wherein:
   in a closed position, the tool parts form a closed mold cavity having a tool wall defining at least part of a shape of a molded part to be foamed, the mold cavity being heatable with a heating medium to foam and/or expand particulate plastic material enclosed in the closed mold cavity until the closed mold cavity is filled,
   the tool wall has, at least in sections, a multilayer structure, wherein the multilayer structure includes:
   a thin inner layer having an inner side which contacts the particulate plastic material upon filling the closed mold cavity with the particulate plastic material,
   a flow-through support layer arranged on an outer side of the inner layer that mechanically supports the inner layer, and wherein the flow-through support layer includes a plurality of support ribs that have a plurality of recesses and form a lattice structure.

2. The device according to claim 1, in which the mold cavity defines a shape of a foamed insulation board.

3. The device according to claim 1, in which the closed mold cavity is formed by a first mold plate forming a lid, a second mold plate lying opposite of the first mold plate and forming a bottom, and a mold frame substantially arranged between the first and second mold plates, wherein at least one of the first and second mold plates or the mold frame has the multilayer structure with the thin inner layer and the flow-through support layer.

4. The device according to claim 1, in which on a side facing towards the closed mold cavity, the thin inner layer has a plurality of openings through which the heating medium is introduced into the closed mold cavity.

5. The device according to claim 1, in which the plurality of support ribs are arranged on the outer side of the inner layer to form the flow-through support layer allowing the heating medium at least in sections to flow through towards the inner layer.

6. The device according to claim 5, in which the flow-through support layer is more than 10 times thicker than the thin inner layer, wherein the density of the inner layer is more than 10 times higher than the density of the flow-through support layer.

7. The device according to claim 1, in which the thin inner layer has a thickness of between 0.5 mm and 2.0 mm.

8. The device according to claim 1, in which the thin inner layer is composed of at least one of a metal sheet, a metal lattice, or a metal screen.

9. The device according to claim 5, in which the flow-through support layer allows for a largely unhindered fluid flow in all directions across the entire extension of the thin inner layer.

10. The device according to claim 5, in which the plurality of support ribs that are oriented vertically relatively to the thin inner layer.

11. The device according to claim 5, in which the flow-through support layer is divided into a plurality of zones across the extension of the thin inner layer, wherein an unhindered fluid flow in all directions is made possible within each of the plurality of zones.

12. The device according to claim 10, in which the support ribs form a rectangular, lattice structure.

13. The device according to claim 5, in which the flow-through support layer is of a foam layer foamed with open pores, or of a sintered layer.

14. The device according to claim 5, in which on outer side of the flow-through support layer, a carrier layer is provided on which the flow-through support layer is secured with the thin inner layer.

15. The device according to claim 14, in which the carrier layer has at least one steam feed opening and/or one evacuation opening and/or one ventilation opening.

16. The device according to claim 15, in which the steam feed opening is connected to a steaming system and/or the evacuation opening is connected to a vacuum system.

17. A device for producing foamed molded parts from particulate plastic materials said mold comprising:
   a tool wall defining at least part of a mold cavity and being heatable with a heating medium to foam and/or expand particulate plastic material enclosed in the mold cavity, the tool wall having, at least in sections, a multilayer structure, wherein the multilayer structure includes:
   an inner layer having an inner side which upon filling the mold cavity with the particulate plastic material contacts the particulate plastic material,
   a flow-through support layer mechanically supporting the inner layer, wherein the flow-through support layer includes a plurality of support ribs that have a plurality of recesses and form a lattice structure.

18. The device according to claim 17, in which on a side facing towards the mold cavity, the inner layer has a plurality of openings through which the heating medium is introduced into the mold cavity.

19. The device according to claim 17, in which the plurality of support ribs are arranged on an outer side of the inner layer to form the flow-through support layer allowing the heat medium to flow through towards the inner layer.

20. The device according to claim 19, in which the flow-through support layer is more than 10 times thicker than the inner layer, wherein the density of the inner layer is more than 10 times higher than the density of the flow-through support layer.

* * * * *

UNITED STATES PATENT AND TRADEMARK OFFICE
CERTIFICATE OF CORRECTION

PATENT NO. : 9,656,415 B2
APPLICATION NO. : 14/378524
DATED : May 23, 2017
INVENTOR(S) : Walter Kurtz et al.

Page 1 of 1

It is certified that error appears in the above-identified patent and that said Letters Patent is hereby corrected as shown below:

In the Claims

In Claim 10, Column 12, Line 6, delete "that".

In Claim 13, Column 12, Line 16, insert --comprised-- between "is" and "of".

In Claim 14, Column 12, Line 18, insert --an-- between "on" and "outer".

Signed and Sealed this
Eleventh Day of July, 2017

Joseph Matal
*Performing the Functions and Duties of the*
*Under Secretary of Commerce for Intellectual Property and*
*Director of the United States Patent and Trademark Office*